UNITED STATES PATENT OFFICE.

JOHN OXLAND AND R. OXLAND, OF PLYMOUTH, ENGLAND.

IMPROVEMENT IN PROCESSES FOR DEFECATING SUGAR.

Specification forming part of Letters Patent No. 9,099, dated July 6, 1852.

*To all whom it may concern:*

Be it known that we, JOHN OXLAND and ROBERT OXLAND, both of Plymouth, England, chemists, subjects of the Queen of Great Britain, have invented or discovered new and useful Improvements in the Manufacture and Refining of Sugar; and we, the said ROBERT OXLAND and JOHN OXLAND, do hereby declare that the nature of our said invention and the manner in which the same is to be performed are fully described and ascertained in and by the following statement thereof—that is to say:

These improvements consist in the combining of acetate of alumina, aluminate of lime, and phosphoric acid for defecating saccharine liquids, or solution of sugar, and for removing their color.

In the treatment of a saccharine liquid or a solution of sugar—say, for example, of an ordinary sample of Mauritius sugar—we dissolve it by blowing up in the usual manner and add to the water employed acetate of alumina in the proportion to the ton of sugar of four pounds of alumina dissolved in acetic acid, and when the solution has been brought to the boiling-point we neutralize any acidity by the addition of aluminate of lime, saccharate of lime, or milk of lime. As, even with careful working, some alumina is liable to be left in solution, we effect its removal by the addition of superphosphate of lime or of superphosphate of alumina, or of phosphoric acid in small quantities, to the saccharine solution and boiling the mixture for a few minutes, then carefully neutralizing any acidity with aluminate of lime, saccharate of lime, or milk of lime. We then pass the sirup through the bag-filters, and as soon as it runs bright it is turned into the receiver from which the vacuum-pan is supplied. The boiling in the vacuum-pan is conducted in the usual manner, as are also the whole of the subsequent operations.

We prepare the acetate of alumina in the following manner: We dissolve sulphate of alumina in water, adding to it a clear solution of soda-ash in water until an alkaline reaction is produced on reddened litmus-paper. We allow the liquor to stand until the alumina is precipitated, then draw off the clear liquor and wash the precipitate with a fresh quantity of water, and again remove it as before, repeating the washing until the hydrometer no longer indicates the presence of any soluble matter. We take the precipitate with as little water as may be, add acetic acid in successive quantities until the whole or nearly all of the alumina is dissolved, taking care not to add an excess of acid. The acetate of alumina acts best when recently prepared. We do not claim this method of preparing acetate of alumina, nor do we confine ourselves thereto, as acetate of alumina for the purpose of our invention may be manufactured by other means.

Instead of the acetate of alumina, aluminate of lime may be employed in such quantity as to afford an equal quantity of alumina to that employed in the form of acetate of alumina. It must be equally diffused throughout the water at the time of blowing up the sugar, and while being brought to the boiling-point sufficient acetic acid, or superphosptate of alumina, or of lime, or of phosphoric acid, is to be added for the neutralization of the lime and the development of the alumina, the addition of an excess of acid sufficient to redden litmus paper being carefully avoided.

In place of the acetate of alumina, either alone or combined with phosphoric acid, as herein explained, phosphates may be combined directly with saccharine fluids, and they are capable of producing similar effects to those produced by the acetate of alumina, with the advantage that the whole of the agent is eventually separated from the saccharine matters.

In the treatment of saccharine liquids, or a solution of sugar, as already described, instead of acetate of alumina we add to the water employed a soluble phosphate. If ordinary crystallized phosphate of soda is to be used, it is to be in the proportion of one and a half pound of the phosphate of soda to the ton of sugar, bringing the solution to the boiling-point, carefully neutralizing any acidity with aluminate of lime, saccharate of lime, milk of lime, or lime-water, and then passing the sirup thus obtained (of specific gravity 25° to 30° Baumé) through the ordinary bag-filters. The sugar will have been thereby defecated, the feculent matters being left in the bags, from which the last traces of sugar may be removed by passing clean water through them. The weak solutions thus obtained may be employed in the blowing up further quantities of raw sugar. As some portions of the color of the sirup are removed in this operation, it may occasionally be deemed sufficient treatment previous to boiling in the vacuum-pan or otherwise for crystallization; but a further amount of color may be removed by using from five to eight per cent. or more of hydrate of alumina which has been dried at a temperature of 212° Fahrenheit diffused through the water used in blowing up the sugar, and thus will the use of animal charcoal be rendered unnecessary.

If superphosphate of alumina be intended to be combined with the saccharine fluid, we use it in the following manner: We mix it in the solution with the water used in blowing up the raw sugar in the proportions of six pounds of alumina dissolved in phosphoric acid for the ton of sugar. While the sirup at 25° to 30° Baumé is being brought to the boiling-point, sufficient aluminate of lime, saccharate of lime, or milk of lime should be applied to neutralize acidity. The fluid should then be passed through the bag-filters and the clear sirup conducted into the receiver from which the vacuum-pan is supplied. The subsequent operations are the same as in the old plan of working. The matters left in the filter-bags should be treated as before described for the separation of the saccharine matters.

The superphosphate of alumina we prepare by dissolving alumina in phosphoric acid, which we prefer obtaining in the following manner, but to which we lay no claim: We burn bones white, grind them to fine powder, and digest the product in sufficient muriatic acid for the solution of the carbonate of lime only. We dry the residue after carefully washing it to remove every trace of soluble matter. To a given weight of this residue, mixed with sufficient water to make it into a thin paste in a shallow tank or vessel of earthenware, we add a quantity of pure sulphuric acid sufficient to combine with nearly all the lime present—that is, excepting about two or three per cent.—stirring the mixture well together and keeping it warm—say above 90° Fahrenheit—for about twenty-four hours. The mass is to be lixiviated with water until all the soluble matters are separated from the sulphate of lime. The strong liquors obtained may be used for combining with the alumina and weak solution for lixiviating fresh quantities of phosphoric acid in course of production. When the alumina is digested in the phosphoric acid thus obtained a phosphate of alumina insoluble in water is first formed, which should be dissolved in a quantity of phosphoric acid sufficient only for that purpose. The superphosphate of alumina thus obtained should be filtered before being used.

The aluminate of lime is prepared by dissolving alumina in caustic potash or soda, and then causing its precipitation by the addition of lime-water or milk of lime, carefully washing the precipitated aluminate of lime, which should be diffused through water when required for use, and we prefer its employment to either that of the saccharate of lime or milk of lime or lime-water. We, however, make no claim to the production of aluminate of lime. When making sugar from the cane we defecate the juice with aluminate of lime or with lime in the usual manner, neutralizing any excess of lime with superphosphate of alumina or of superphosphate of lime or with acetic acid, and after filtering and concentrating the filtered liquor from 25° to 30° Baumé we treat the sirup with phosphate of soda in the same manner as with the raw sugars, and after a second filtration we boil in the usual manner.

In the manufacture of beet-root sugar we prefer the use of aluminate of lime to that of lime alone in sufficient quantities for defecation, employing either acetic acid or superphosphate of alumina or of lime for the neutralization of the lime and the development of the alumina.

Having thus described the nature of our improvements and the manner of performing the same, we would have it understood that we do not confine ourselves to the details as herein given, nor to the phosphates mentioned, as others may be substituted.

What we claim is—

The use of aluminate of lime, in combination with the superphosphate of alumina or of lime or with the phosphoric acid for clarifying cane-juice or sirups, as set forth; but we disclaim the use of phosphoric acid, except in combination with the above-named bases.

JOHN OXLAND.
ROBERT OXLAND.

Witnesses:
  W. A. CLARK,
  W. H. OXLAND.